US012782960B2

(12) United States Patent
Chung et al.

(10) Patent No.: US 12,782,960 B2
(45) Date of Patent: Nov. 3, 2026

(54) MOBILE ROBOT CAPABLE OF LEARNING RISK-AWARE TRAVERSABILITY VIA ACCUMULATED NAVIGATION EXPERIENCE

(71) Applicant: KOREA UNIVERSITY RESEARCH AND BUSINESS FOUNDATION, Seoul (KR)

(72) Inventors: WooJin Chung, Seoul (KR); IkHyeon Cho, Seoul (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 8 days.

(21) Appl. No.: 19/073,232

(22) Filed: Mar. 7, 2025

(65) Prior Publication Data

US 2025/0284288 A1 Sep. 11, 2025

(30) Foreign Application Priority Data

Mar. 8, 2024 (KR) ........................ 10-2024-0033366

(51) Int. Cl.
*G05D 1/617* (2024.01)
*G05D 1/246* (2024.01)
(Continued)

(52) U.S. Cl.
CPC ........... *G05D 1/617* (2024.01); *G05D 1/2469* (2024.01); *G05D 2101/15* (2024.01); *G05D 2111/17* (2024.01)

(58) Field of Classification Search
CPC .. G05D 1/617; G05D 1/2469; G05D 2101/15; G05D 2111/17; G05D 1/242;
(Continued)

(56) References Cited

U.S. PATENT DOCUMENTS

2022/0206491 A1* 6/2022 Chung .................. G01S 17/931

OTHER PUBLICATIONS

Lee, Hyunsuk, and Woojin Chung. "A self-training approach-based traversability analysis for mobile robots in urban environments." 2021 IEEE International Conference on Robotics and Automation (ICRA). IEEE, 2021. (Year: 2021).*

(Continued)

*Primary Examiner* — Adam R Mott
*Assistant Examiner* — Matthew C Gammon
(74) *Attorney, Agent, or Firm* — Studebaker Brackett PLLC

(57) ABSTRACT

Proposed is a mobile robot capable of learning risk-aware traversability via accumulated navigation experience. The mobile robot includes a point cloud sensor which acquires point cloud data, an elevation map generation part which generates a grid-based elevation map by using the point cloud data, an attribute data generation part which calculates a plurality of types of terrain attribute values for each of grid cells from the elevation map and generates attribute data sets having the plurality of types of terrain attribute values for each of the grid cells, a training data generation part which generates a plurality of traversability training data sets and a plurality of non-traversability training data sets by labeling whether each of the attribute data sets is in traversable condition, a risk calculation part which calculates a traversal risk, and a risk-aware self-training part which trains a traversability evaluation model for traversability evaluation through self-training.

11 Claims, 9 Drawing Sheets

(51) Int. Cl.
*G05D 101/15* (2024.01)
*G05D 111/10* (2024.01)

(58) Field of Classification Search
CPC ... G05D 2109/10; G05D 1/644; B25J 9/1674; B25J 5/00; B25J 9/163; B25J 13/08; G06N 3/0895
See application file for complete search history.

(56) References Cited

OTHER PUBLICATIONS

Frey, Jonas, et al. "Locomotion policy guided traversability learning using volumetric representations of complex environments." 2022 IEEE/RSJ International Conference on Intelligent Robots and Systems (IROS). IEEE, 2022. (Year: 2022).*

Suger, Benjamin, Bastian Steder, and Wolfram Burgard. "Traversability analysis for mobile robots in outdoor environments: A semi-supervised learning approach based on 3D-lidar data." 2015 IEEE International Conference on Robotics and Automation (ICRA). IEEE, 2015. (Year: 2015).*

Li, Junnan, et al. "Learning to learn from noisy labeled data." Proceedings of the IEEE/CVF conference on computer vision and pattern recognition. 2019. (Year: 2019).*

Ollis, Mark, Wesley H. Huang, and Michael Happold. "A bayesian approach to imitation learning for robot navigation." 2007 IEEE/RSJ International Conference on Intelligent Robots and Systems. IEEE, 2007. (Year: 2007).*

Cho, Ikhyeon, and Woojin Chung. "Learning self-supervised traversability with navigation experiences of mobile robots: A risk-aware self-training approach." IEEE Robotics and Automation Letters 9.5 (2024): 4122-4129. (Year: 2024).*

Guan, Tianrui et al.; "Ga-Nav: Efficient Terrain Segmentation for Robot Navigation in Unstructured Outdoor Environments;" IEEE Robotics and Automation Letters; Jun. 18, 2022; vol. 7; No. 3; pp. 8138-8145.

Lee, Hyunsuk et al.; "A Self-Training Approach-Based Traversability Analysis for Mobile Robots in Urban Environments;" 2021 IEEE International Conference on Robotics and Automation; May 31-Jun. 4, 2021; Xi'an, China; pp. 3389-3394.

Barnes, Dan et al.; "Find Your Own Way: Weakly Supervised Segmentation of Path Proposals for Urban Autonomy;" 2017 IEEE International Conference on Robotics and Automation; Nov. 17, 2017; pp. 1-8.

Suger, Benjamin et al.; "Traversability Analysis for Mobile Robots in Outdoor Environments: A Semi-Supervised Learning Approach Based on 3D-LIDAR Data;" 2015 IEEE International Conference on Robotics and Automation; Jul. 2, 2015; pp. 1-6.

* cited by examiner

MOBILE ROBOT CAPABLE OF LEARNING RISK-AWARE TRAVERSABILITY VIA ACCUMULATED NAVIGATION EXPERIENCE

CROSS REFERENCE TO RELATED APPLICATION

The present application claims priority to Korean Patent Application No. 10-2024-0033366, filed Mar. 8, 2024, the entire contents of which are incorporated herein for all purposes by this reference.

BACKGROUND OF THE INVENTION

Field of the Invention

The present disclosure generally relates to a mobile robot capable of learning risk-aware traversability via accumulated navigation experience. More particularly, the present disclosure relates to a mobile robot which generates a traversability evaluation model for assessing terrain traversability through risk-aware learning and can autonomously recognize hazardous terrain through experience-based traversability evaluation on the basis of self-supervised learning.

Description of the Related Art

An autonomous mobile robot has advanced significantly in recent years. In particular, transition from indoor environments to outdoor terrains presents significant potential across various fields. A representative example is last-mile delivery robots in urban environments.

However, unlike controlled indoor environments, outdoor terrains often feature complex geometric structures and pose significant risks. Predicting terrain traversability is very important because real-world applications require a high level of safety.

Recent studies have focused on directly learning traversable terrains by using data-driven approaches. For example, the paper by T. Guan et al., titled "*Ga-Nav: Efficient Terrain Segmentation for Robot Navigation in Unstructured Outdoor Environments*" (IEEE Robotics and Automation Letters, vol. 7, no. 3, pp. 8138-8145, 2022), successfully predicted mapping from terrain features to traversability by using a deep neural network.

However, one of the limitations of the above approach is that it relies heavily on human-provided labels. That is, the manual labeling process is difficult to scale to large data sets required for individual robots.

Another approach, as presented in the paper by H. Lee and W. Chung titled "*A Self-Training Approach-Based Traversability Analysis for Mobile Robots in Urban Environments*" (2021 IEEE International Conference on Robotics and Automation, 2021), involves learning from previous exploring experiences of a mobile robot. The mobile robot may develop a model of its self-driving potential by simply exploring various types of terrain.

Meanwhile, many previous studies used a self-supervised learning method to derive a traversability model. For example, in the paper by D. Barnes, W. Maddern, and I. Posner titled "*Find Your Own Way: Weakly Supervised Segmentation of Path Proposals for Urban Autonomy*" (2017 IEEE International Conference on Robotics and Automation, 2017), the trajectories of a human-driven vehicle were projected onto camera images and utilized as self-supervised labels for urban roads.

Similarly, in the paper by B. Suger, B. Steder, and W. Burgard titled "*Traversability Analysis for Mobile Robots in Outdoor Environments: A Semi-Supervised Learning Approach Based on 3D-LIDAR Data*" (2015 IEEE International Conference on Robotics and Automation, 2015), human-manipulated robot footprints were used to learn traversable geometry in a multinomial feature space.

However, the conventional self-supervised learning methods faced serious problems due to lack of data and bias in high-risk areas. In everyday environments, service robots must prioritize safety while performing their tasks. This priority creates a fundamental conflict between operational safety and comprehensive exploration of hazardous areas.

As a result, the learned traversability model often tends to overfit to easily traversable main areas, and exhibits high uncertainty for previously unexperienced high-risk terrains. In addition, when a person manually drives a mobile robot to accumulate experience with the mobile robot, difference between a learning environment of the mobile robot and an actual operating environment may be increased due to the bias of a driver in trying to avoid hazardous terrain. This distorted understanding of environmental risks actually significantly reduces the safety and efficiency of services provided by the mobile robot.

In order to solve the above problems, some proposed methods include active learning for a mobile robot to actively explore hazardous terrain or learning the traversability of a mobile robot within simulation equipped with a physics engine.

In the case of the active learning method, it is possible to solve the overfitting problem and achieve high performance of a learning model by identifying a driving experience that the mobile robot currently lacks and accumulating the lacking experience. However, in safety-critical applications, the use of the technology is limited due to potential risks.

In the case of learning in a simulation, a mobile robot may be exposed to various and challenging scenarios, allowing the mobile robot to learn traversability for different terrains without real-world risks. However, in order to simulate various structured/unstructured environments in reality, a high level of environmental modeling is required, and due to difference between simulation and a real environment, especially in terms of physical interactions or accuracy of sensor data, it is still difficult for a model trained in the simulation to operate successfully in real environments.

SUMMARY OF THE INVENTION

Accordingly, the present disclosure has been made keeping in mind the above problems occurring in the related art, and the present disclosure is intended to propose a mobile robot capable of learning risk-aware traversability via accumulated navigation experience, in which the risk of a terrain traversed by the mobile robot is reflected in self-training so that the impact of a hazardous area is reflected in a traversability evaluation model.

In order to achieve the objectives of the present disclosure, there is provided a mobile robot capable of learning risk-aware traversability via accumulated navigation experience, the mobile robot including: a point cloud sensor which acquires point cloud data; an elevation map generation part which generates a grid-based elevation map by using the point cloud data; an attribute data generation part which calculates a plurality of types of terrain attribute values for each of grid cells from the elevation map and generates attribute data sets having the plurality of types of terrain attribute values for each of the grid cells; a training data generation part which generates a plurality of traversability training data sets and a plurality of non-traversability training data sets by labeling whether or not each of the attribute data sets is in traversable condition; a risk calculation part which calculates a traversal risk for each of the traversability training data sets; and a risk-aware self-training part which trains a traversability evaluation model for traversability evaluation through self-training thereof which uses the plurality of traversability training data sets and the plurality of non-traversability training data sets, wherein the traversal risk is reflected in the self-training.

Here, the training data generation part may generate the traversability training data sets by labeling, as traversable, the attribute data sets for grid cells on a trajectory traversed by the mobile robot; and generate the non-traversability training data sets by labeling, as non-traversable, attribute data sets outside an attribute threshold set for at least one type of the plurality of types of terrain attribute values among the attribute data sets for grid cells other than the trajectory traversed by the mobile robot.

Furthermore, the risk calculation part may calculate an intrinsic risk as a weighted average of the plurality of types of terrain attribute values which constitute the traversability training data sets; and calculate a cumulative risk as a relative risk of the corresponding traversability training data set compared to the entire traversability training data sets on the basis of the intrinsic risk calculated for each of the traversability training data sets.

In addition, the intrinsic risk may be calculated by mathematical expression $$\mathcal{R}_{int}(x_i)=w^T x_i$$

($x_i$ refers to the attribute data set, i refers to the index of the grid cell, $\mathcal{R}_{int}(x_i)$ refers to the intrinsic risk of the attribute data set $x_i$, and W refers to a vector consisting of a weight reflected in each of the terrain attribute values).

In addition, the cumulative risk may be calculated by mathematical expression $$\mathcal{R}_{cum}(x_i) = \frac{1}{n}\sum_{k=1}^{n}\mathbb{I}(r_k \leq r_i)$$

($\mathcal{R}_{cum}(x_i)$ refers to the cumulative risk of the attribute data set $x_i$, n refers to the number of the traversability training data sets, $\mathbb{I}$ refers to an evaluation function that evaluates to 1 when condition in the parenthesis is met and 0 when the condition in the parenthesis is not met, $r_i$ refers to the intrinsic risk of the attribute data set $x_i$, and $r_k$ refers to the intrinsic risk of the attribute data set with a grid-cell index k).

In addition, the risk calculation part may calculate an importance weight on the basis of the intrinsic risk and the cumulative risk for each of the traversability training data sets; and the risk-aware self-training part may reflect the importance weight and the cumulative risk in the self-training of the traversability evaluation model.

In addition, the importance weight may be calculated by a product of the intrinsic risk and the cumulative risk.

In addition, the risk-aware self-training part may reflect the importance weight and the cumulative risk in a loss function of the traversability evaluation model.

Here, the loss function may include: a weighted loss function in which the importance weight is reflected; and a regularization loss function in which the cumulative risk is reflected.

In addition, the weighted loss function may be defined as mathematical expression $$\mathcal{L}_i(\theta) = -w_i(y_i\log(p_i) + (1-y_i)\log(1-p_i))$$

($w_i$ refers to the importance weight, $p_i$ refers to a multilayer perceptron (MLP) with learnable parameters θ, and $y_i$ refers to a labeling value);

the regularization loss function may be defined as mathematical expression $$\mathcal{L}_{entropy,i}(\theta) = -\mathcal{R}_{cum}(x_i)\cdot p_i\log(p_i);$$

and a learning objective function of the traversability evaluation model may be defined as mathematical expression $$\min_{\theta}\frac{1}{N}\sum_{i=1}^{N}\{\mathcal{L}_i(\theta) + \lambda\mathcal{L}_{entropy,i}(\theta)\}$$

(N refers to the total number of the traversability training data sets and the non-traversability training data sets, and A refers to a contribution of the regularization loss function).

In addition, the terrain attribute values may include at least two values of a step height value, a slope value, a roughness value, a curvature value, and an elevation variance value.

In addition, the mobile robot may further include: a noisy training data removal part which removes, as noise, a traversability training data set or a non-traversability training data set whose labeling value has changed on the basis of change over time in the labeling value for each of the traversability training data sets and each of the non-traversability training data sets.

According to the above configuration, the present disclosure proposes the mobile robot capable of learning risk-aware traversability via accumulated navigation experience, in which the risk of a terrain traversed by the mobile robot is reflected in self-training so that the impact of hazardous area is reflected in a traversability evaluation model.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Figure 1:
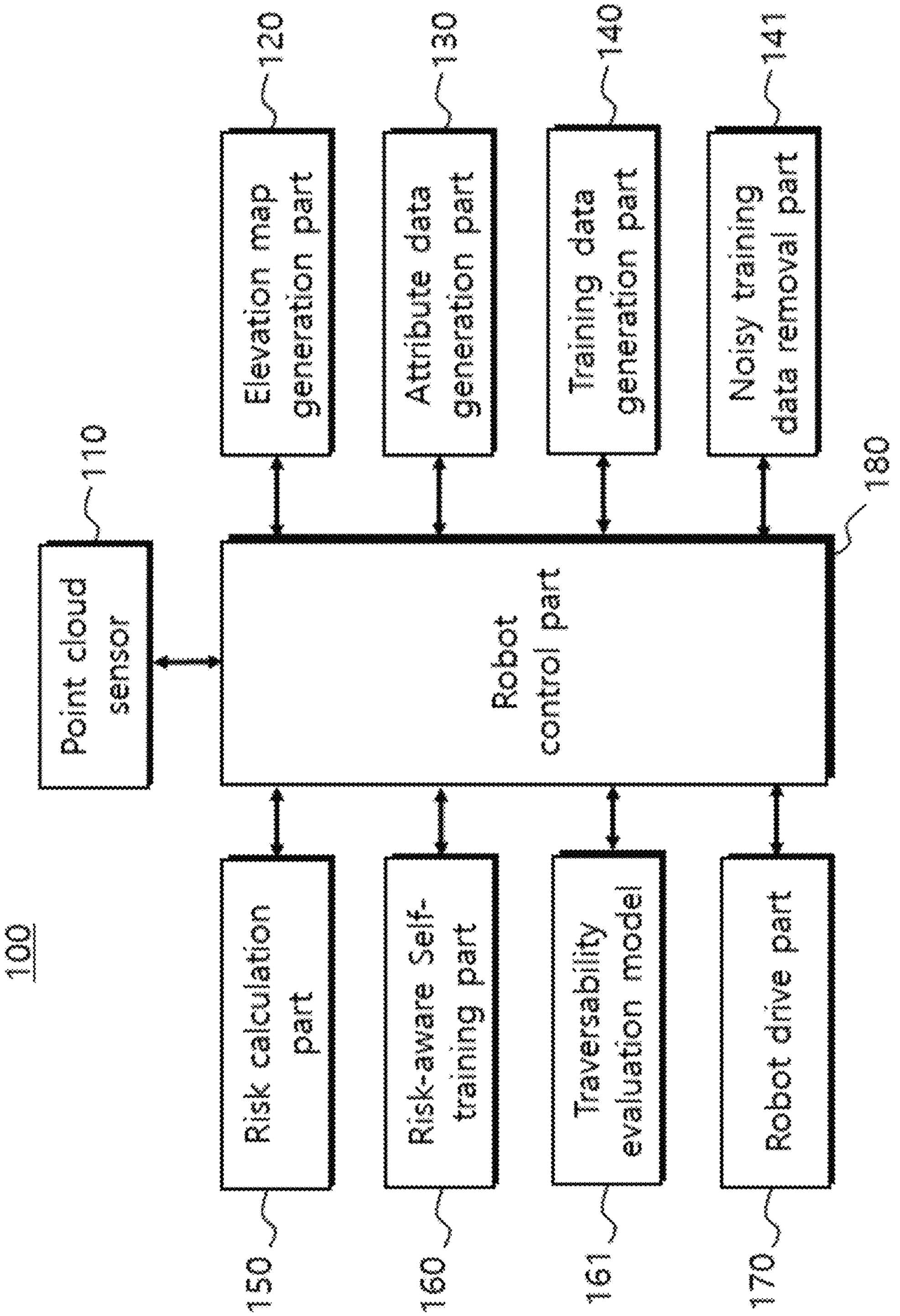
FIG. 1 is a diagram illustrating the configuration of a mobile robot capable of learning risk-aware traversability via accumulated navigation experience according to the embodiment of the present disclosure.

Advantages and characteristics of the present disclosure, and methods for achieving them will become clear with reference to embodiments described later in detail in conjunction with the accompanying drawings. However, the present disclosure is not limited to the embodiments disclosed below and may be implemented in a variety of different forms. However, these embodiments are provided to make the disclosure of the present invention complete and to completely inform those skilled in the art of the scope of the invention to which the present disclosure belongs, and the present disclosure is only defined by the scope of the claims.

Terms used herein are intended to describe embodiments and are not intended to limit the present disclosure. In this specification, singular forms also include plural forms, unless specifically stated otherwise in the context. As used in the specification, "comprises" and/or "comprising" does not exclude the presence or addition of one or more other elements in addition to mentioned elements. Like reference numerals refer to like elements throughout the specification, and "and/or" includes each and every combination of one or more of the referenced elements. Although "first", "second", etc. are used to describe various components, these components are of course not limited by these terms. These terms are merely used to distinguish one component from another. Accordingly, a first component mentioned below may also be a second component within the technical idea of the present disclosure.

Unless otherwise defined, all terms (including technical and scientific terms) used herein may be used in the same manner as would be commonly understood by those skilled in the art to which the present disclosure belongs. In addition, terms defined in commonly used dictionaries are not to be idealized or over-interpreted unless explicitly and specifically defined.

Figure 2:
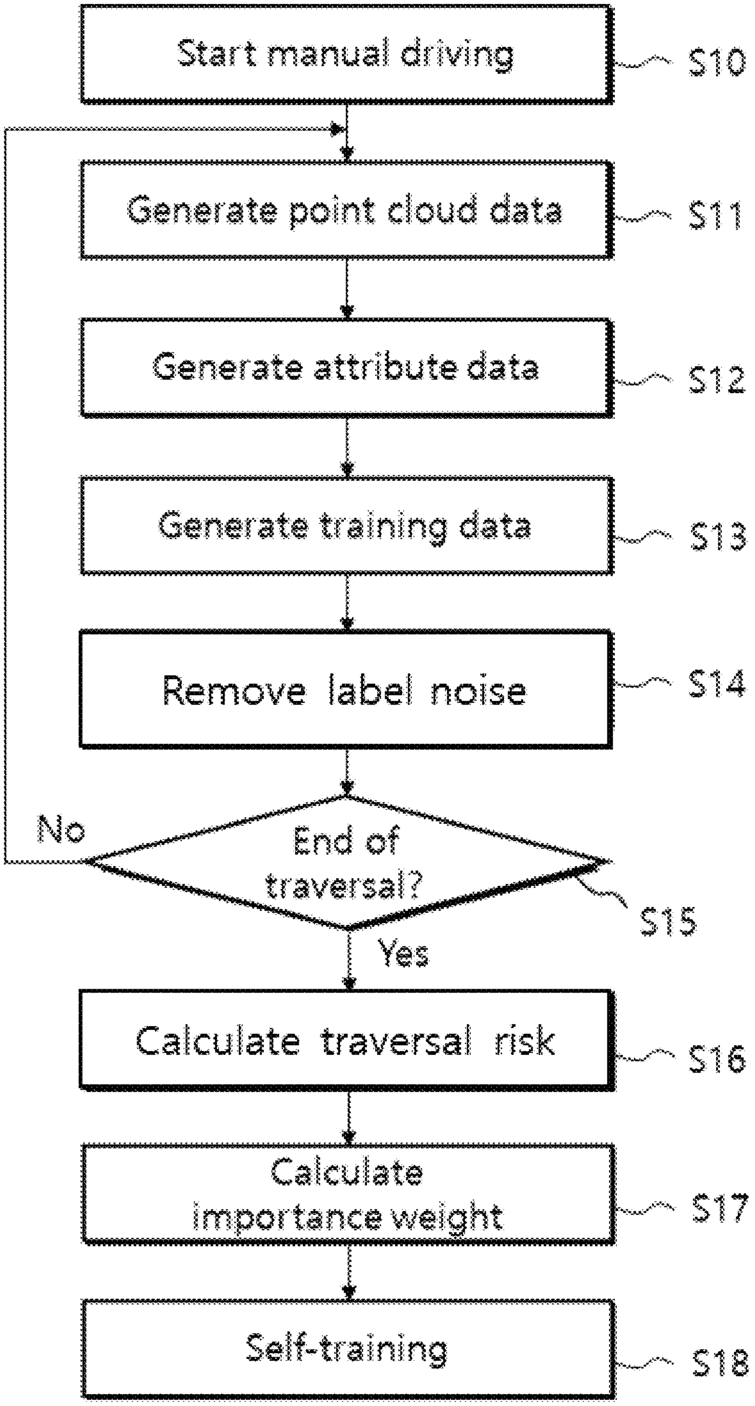
FIG. 2 is a flowchart illustrating a self-training process of the mobile robot capable of learning risk-aware traversability via accumulated navigation experience according to the embodiment of the present disclosure.

FIG. 1 is a diagram illustrating the configuration of a mobile robot 100 capable of learning risk-aware traversability via accumulated navigation experience according to an embodiment of the present disclosure, and FIG. 2 is a flowchart illustrating a self-learning process of the mobile robot 100 capable of learning risk-aware traversability via accumulated navigation experience according to the embodiment of the present disclosure.

In the embodiment of the present disclosure, the self-learning process illustrated in FIG. 2 is performed by using point cloud data acquired by a point cloud sensor 110 to be described later while a user manually drives the mobile robot 100 in a driving environment.

Referring to FIG. 1, the mobile robot 100 according to the embodiment of the present disclosure may include the point cloud sensor 110, an elevation map generation part 120, an attribute data generation part 130, a training data generation part 140, a risk calculation part 150, and a risk-aware self-training part 160. In addition, the mobile robot 100 may include a traversability evaluation model 161, a robot drive part 170, and a robot control part 180.

The point cloud sensor 110 according to the embodiment of the present disclosure senses the driving environment of the mobile robot 100 while the mobile robot 100 is driving so as to acquire the point cloud data. In the embodiment of the present disclosure, as an example, the point cloud sensor 110 is a 3D LiDAR sensor to obtain 3D information on each point cloud. Of course, the point cloud sensor 110 may be provided in the form of a stereo camera.

For example, as illustrated in FIG. 2, when a user manually starts driving the mobile robot 100 in a driving environment in S10, the point cloud sensor 110 may sense the driving environment during the driving process of the mobile robot 100 to generate the point cloud data in S11.

In an embodiment, the robot control part 180 may traverse the mobile robot 100 according to the manipulation of a user by controlling the robot drive part 170. In the embodiment of the present disclosure, the robot drive part 170 is exemplified to be configured as a two-wheel differential drive type. However, this is merely one embodiment, and various other drive methods may be applied.

The elevation map generation part 120 according to the embodiment of the present disclosure may generate a grid-based elevation map by using the point cloud data acquired by the point cloud sensor 110. In an embodiment, the elevation map generated by the elevation map generation part 120 may include height information such as height, variance, maximum height, and minimum height at each grid cell.

The attribute data generation part 130 according to the embodiment of the present disclosure may calculate a plurality of types of terrain attribute values for each grid cell from the elevation map generated by the elevation map generation part. In the embodiment of the present disclosure, the terrain attribute values include at least two values of a step height value, a slope value, a roughness value, a curvature value, and an elevation variance value. In an embodiment, the five types of terrain attribute values exemplified above are calculated.

In an embodiment, the step height value may be derived by maximum height difference between adjacent cells. In addition, the slope value may be calculated by an angle between the normal vector and gravity vector of a road surface. In addition, the roughness value may be determined by the smallest eigenvalue of an elevation covariance, and the curvature value may be calculated from the eigenvalues of the covariance matrix of adjacent points.

In addition, the elevation variance value is calculated through the variance of the elevation values of the point cloud data within a corresponding grid cell, and reflects the uncertainty of the estimation of elevation, i.e., height, calculated for the corresponding grid cell.

When the terrain attribute values are calculated as described above, the attribute data generation part 130 can generate an attribute data set composed of the terrain attribute values for each grid cell in S12. In an embodiment, the attribute data set may be represented as $x_i=\{h_i, s_i, r_i, c_i, \sigma_i^{-2}\}$, wherein h, s, r, c and σ2 are the step height value, the slope value, the roughness value, the curvature value, and the elevation variance value, respectively, and i is an index of the grid cell.

The training data generation part 140 according to the embodiment of the present disclosure may generate a training data set by labeling whether or not each of attribute data sets is in traversable condition in S13. In one embodiment, the training data generation unit 140 labels the attribute data sets as traversable to generate traversability training data sets when the attribute data sets are determined to be in traversable condition, and labels the attribute data sets as non-traversable to generate non-traversability training data sets when the attribute data sets are determined to be in non-traversable condition.

Through the above process, until manual driving ends in S15, the plurality of traversability training data sets and the plurality of non-traversability training data sets may be generated.

In an embodiment, the training data generation part 140 may generate the traversability training data sets by labeling, as traversable, the attribute data sets for grid cells on a trajectory traversed by the mobile robot 100.

In addition, the training data generation part 140 may generate the non-traversability training data sets by labeling, as non-traversable, the attribute data sets outside an attribute threshold set for at least one type of the plurality of types of terrain attribute values among the attribute data sets for grid cells other than the traversing trajectory of the mobile robot 100.

In an embodiment, the training data generation part 140 may generate the non-traversability training data set by labeling the corresponding attribute data set as non-traversable when the step height value of the corresponding attribute data set is greater than the attribute threshold set for the step height value among the terrain attribute values.

Here, the terrain attribute value—whose attribute threshold is determined according to the specification of the mobile robot 100—is set to an allowable threshold. It is preferable that a person can intuitively understand the meaning of the value, and a representative example of this may be the step height value.

As another example, the slope value may also have a set attribute threshold, and in a case in which each of the step height value and the slope value has a set attribute threshold, when one of the values exceeds the attribute threshold, a corresponding attribute data set may be labeled as non-traversable.

Figure 3:
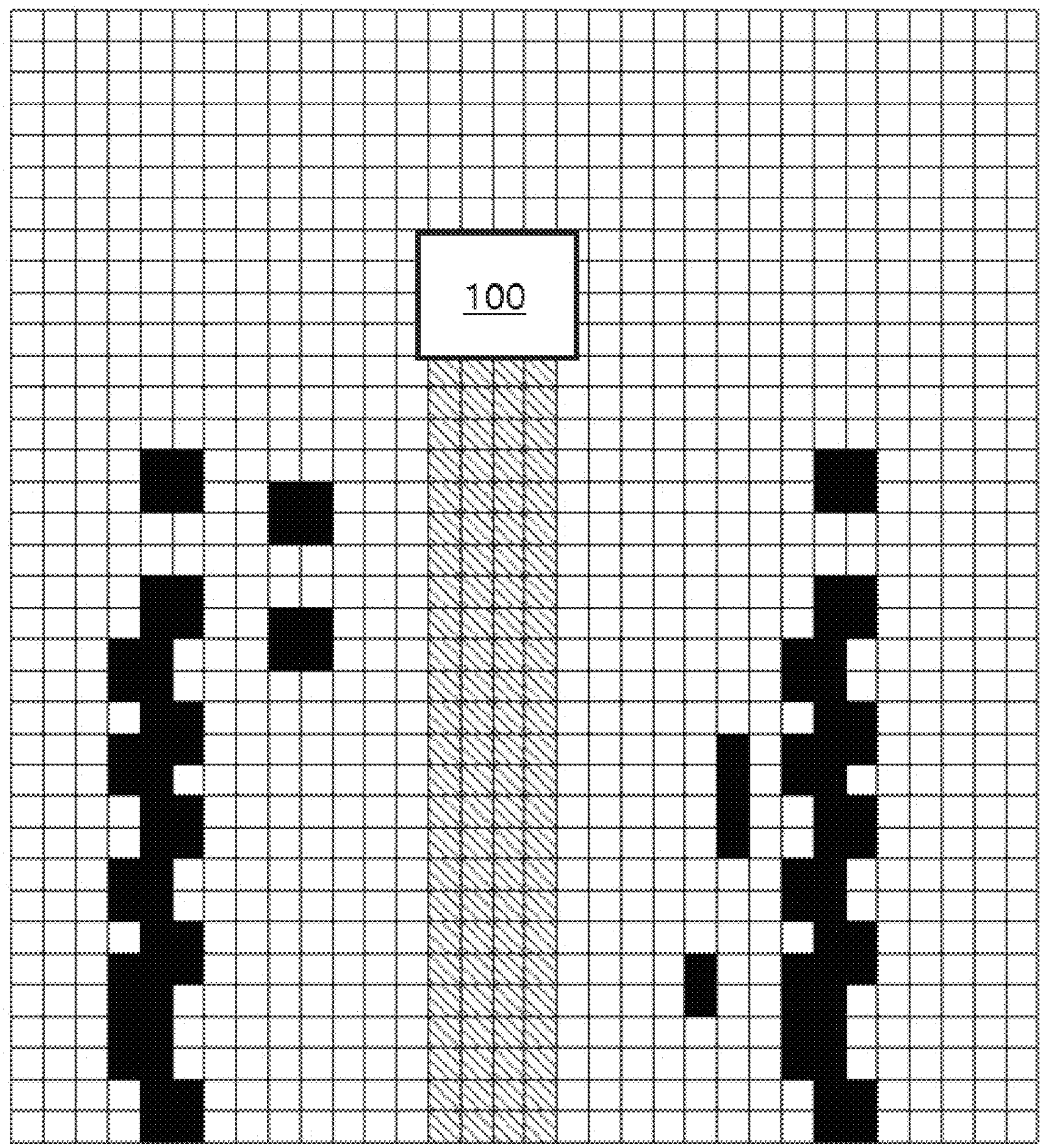
FIG. 3 is a view illustrating an example of labeling grid cells on an elevation map in the embodiment of the present disclosure as traversable or non-traversable.

FIG. 3 is a view illustrating an example of labeling grid cells on the elevation map as traversable or non-traversable by using the above method. Referring to FIG. 3, grid cells on a trajectory traversed by the mobile robot 100 may be labeled as traversable, and grid cells other than the trajectory may be labeled as non-traversable through comparison with the attribute threshold.

Additionally, grid cells that are not labeled as traversable or non-traversable areas are assigned pseudo-labels and used as auxiliary training data sets during the self-learning process.

Meanwhile, the mobile robot 100 according to the embodiment of the present disclosure may include a noisy training data removal part 141. The noisy training data removal part 141 according to the embodiment of the present disclosure may remove, as label noise, a traversability training data set or a non-traversability training data set whose labeling value has changed on the basis of change over time in the labeling value, i.e., change over time of traversability or non-traversability, for each of the traversability training data sets and each of the non-traversability training data sets in S14.

For example, the non-traversability training data sets, which are determined by the attribute threshold, are generated without the verification of a user, so the reliability of their values is not high.

In the actual traversing environment of the mobile robot 100, errors may occur in the terrain attribute values that constitute the attribute data sets due to various sources of error, such as noisy depth measurement, occlusion, and drift in pose estimation.

A common way to identify noisy labels may include considering statistical approaches to detect and remove an outlier. However, it is difficult to set appropriate parameters for detecting the outlier in heterogeneous terrains in which the distribution of terrain attributes varies from place to place. There is the risk that appropriate data samples with large standard deviations are excessively removed.

Accordingly, in the embodiment of the present disclosure, temporal changes in the label $\hat{y}_i$ of a grid-cell index i are detected, and training data sets for grid cells whose label values change over time are treated as noises and removed.

For example, before the mobile robot 100 traverses, certain grid cells in the front traversing environment are labeled as non-traversable by an attribute threshold, but when the mobile robot 100 passes through the corresponding grid cells during a manual traversing process by a user, the corresponding grid cells are labeled as traversable.

Therefore, since there is change in a labeling value as the corresponding cells are initially labeled as non-traversable and then later labeled as traversable, the corresponding grid cells are removed from the training data sets by the noisy training data removal part 141.

Through the above process, until the traversing of the mobile robot 100 by a user ends, a plurality of training data sets for the traversing trajectory of the mobile robot 100 and surrounding environment thereof, that is, the plurality of traversability training data sets and the plurality of non-traversability training data sets can be acquired.

Meanwhile, the risk calculation part 150 according to the embodiment of the present disclosure may calculate a traversal risk for each of the traversability training data sets in S16. In an embodiment, the risk calculation part 150 may calculate an intrinsic risk and a cumulative risk as the traversal risk.

In general, the experience of the mobile robot 100 in hazardous terrain during its actual traversing environment is a key to strong generalization for future traversing. However, it is not realistically feasible to perform actual traversing on hazardous terrain during training due to the risk of damage to the mobile robot 100 in very challenging terrain.

Figure 4A:
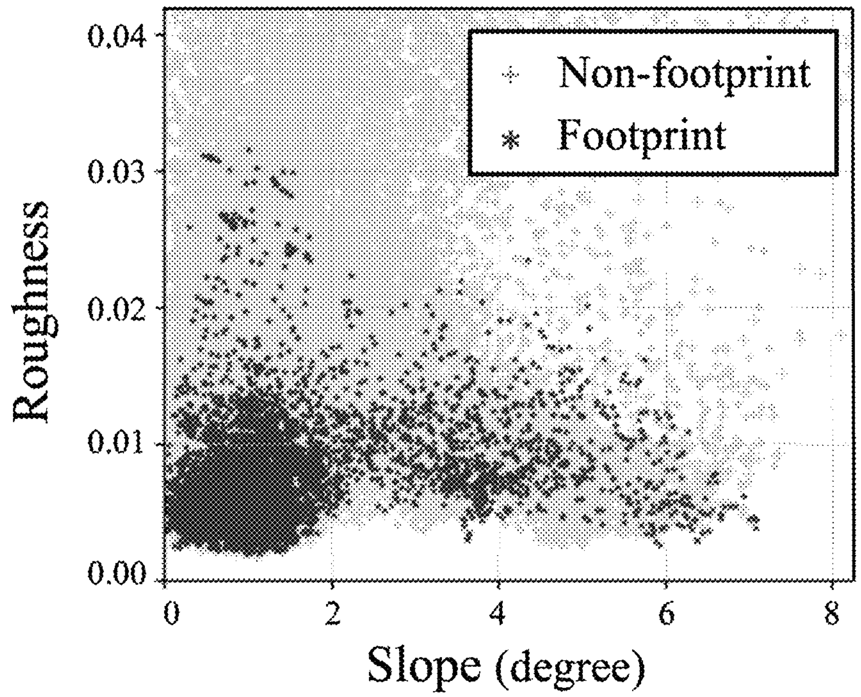
FIGS. 4A, 4B, 5A, 5B, 5C, and 5D are graphs illustrating examples of data distributions of attribute data sets collected in the self-learning process of the mobile robot capable of learning risk-aware traversability via accumulated navigation experience according to the embodiment of the present disclosure.

FIG. 4A illustrates the distribution of the collected traversability training data of the mobile robot 100 in the s-r plane of an attribute space, i.e., a slope-roughness plane, and the distribution of the remaining data sets excluding the traversability training data sets and the footprint data.

As illustrated in FIG. 4A, it can be seen that there is a serious imbalance within distribution of traversability training data. When the traversability evaluation model 161 is trained with such an imbalanced data set, the mobile robot 100 predicts a biased traversability toward areas in which the mobile robot 100 is easy to traverse.

Figure 4B:
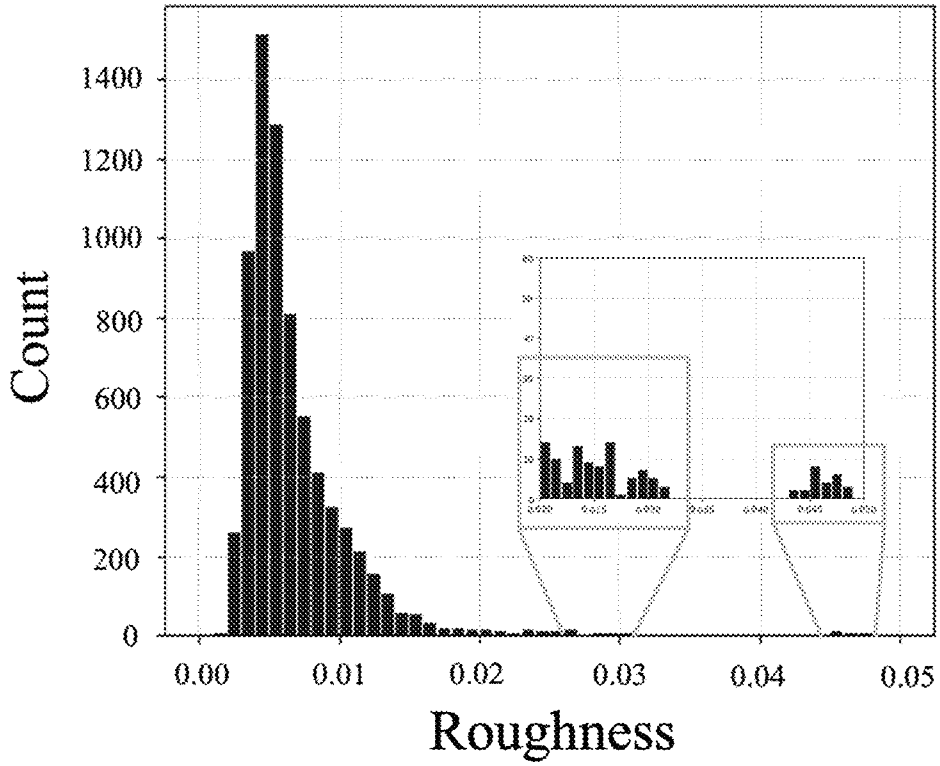

FIG. 4B illustrates a histogram for the traversability training data sets, with roughness values recorded along an x-axis. About 95.2% of the data lies below 0.01, indicating that smooth terrain surfaces are dominant for traversing in the experience of the mobile robot 100. This indicates that the traversability on rough terrain is seriously underestimated in the training data set. As a result, the traversability evaluation model 161 trained on this basis produces overly conservative predictions, limiting the ability of the mobile robot 100 to navigate on diverse terrains.

Accordingly, in the embodiment of the present disclosure, the risk calculation part 150 calculates the intrinsic risk and the cumulative risk for the traversability training data sets as described earlier, and reflects the traversal risk in the traversability training data set.

Here, the intrinsic risk reflects the terrain attribute values which constitute the traversability training data sets, that is, inherent attributes of terrain. In addition, the cumulative risk reflects the increasing experience of the mobile robot 100 and adaptability to different terrains over time, and reflects the relative risk of each traversability training data set compared to the entire traversability training data sets.

In the embodiment of the present disclosure, the risk calculation part 150 calculates the intrinsic risk as the weighted average of the plurality of types of terrain attribute values which constitute the traversability training data sets.

In an embodiment, the risk calculation part 150 calculates the intrinsic risk by using [Mathematical expression 1].

$$\mathcal{R}_{int}(x_i) = w^T x_i \qquad \text{[Mathematical expression 1]}$$

Here, $x_i$ refers to the attribute data sets, i.e., the traversability training data set, labeled as traversable, as described above. In addition, $\mathcal{R}_{int}(x_i)$ refers to the intrinsic risk of the attribute data sets $x_i$, and w refers to a vector consisting of a weight reflected in each of the terrain attribute values. Here, the sum of the weights, which are vector elements constituting w, is set to 1, so that the weights may be determined according to the importance of each of the terrain attribute value.

For example, in the case of the mobile robot 100 traversing on a road within a university campus, wherein the mobile robot 100 moves by using wheels, the height of steps, such as curbs, is an important factor in determining whether the mobile robot 100 can traverse, so the weight for the height of steps may be set high.

Meanwhile, the risk calculation part 150 may calculate the cumulative risk by using the intrinsic risk calculated for the traversability training data sets. In an embodiment, the risk calculation part 150 may calculate the cumulative risk through [Mathematical expression 2].

$$\mathcal{R}_{cum}(x_i) = \frac{1}{n}\sum_{k=1}^{n}\mathbb{I}(r_k \le r_i) \qquad \text{[Mathematical expression 2]}$$

As in the calculation of the intrinsic risk, $x_i$ refers to the attribute data sets generated from the traversability training data sets, and n refers to the total number of the traversability training data sets. In addition, $\mathbb{I}$ refers to an evaluation function that evaluates to 1 when condition in the parenthesis is met and 0 when the condition in the parenthesis is not met, $r_i$ refers to the intrinsic risk of the attribute data sets $x_i$, and $r_k$ refers to the intrinsic risk of the attribute data sets with the grid-cell index k.

[Mathematical expression 2] utilizes the empirical cumulative distribution function (eCDF), which reflects the possibility of encountering various terrains on the basis of past experience so as to effectively capture the exposure of the mobile robot 100 to various terrain risks over time.

Figure 5A:
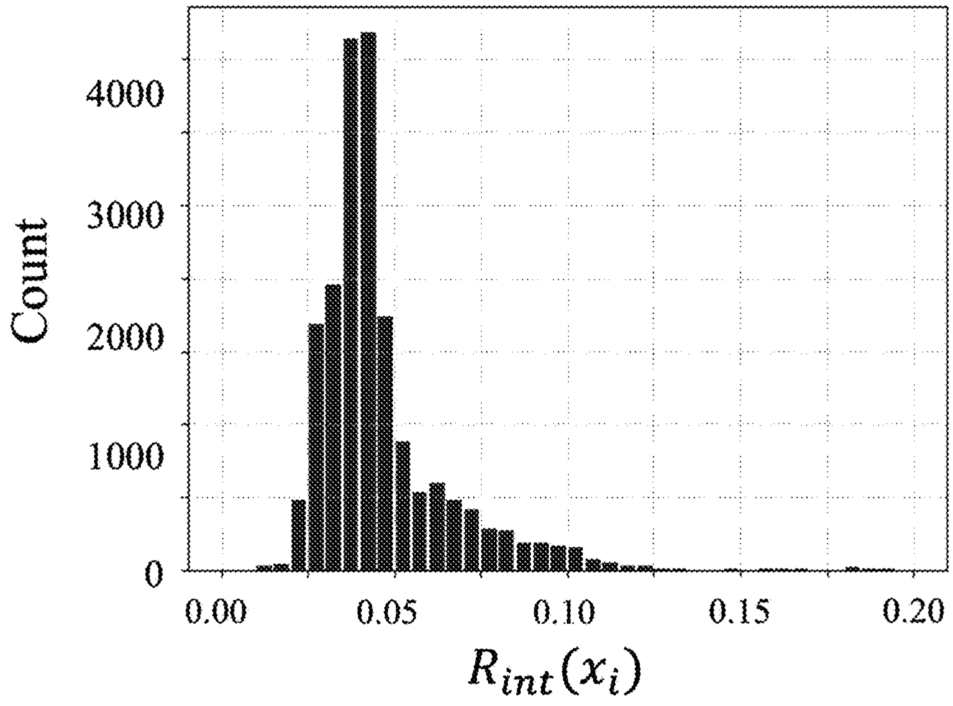
Figure 5B:
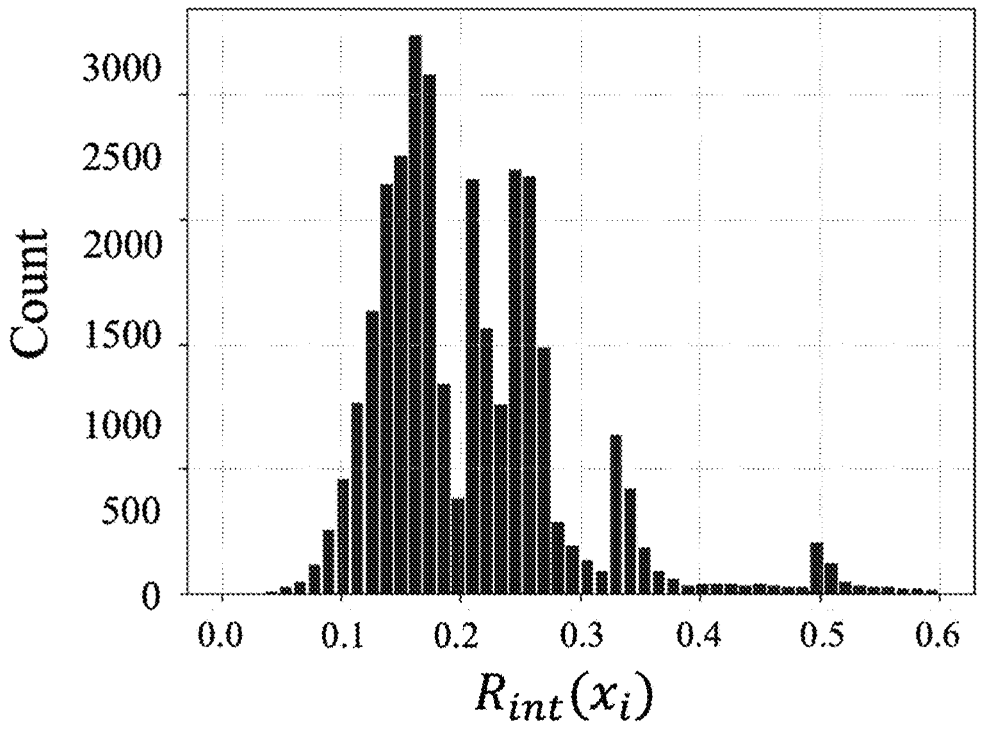

FIGS. 5A and 5B illustrate histograms of the intrinsic risk of the mobile robot 100. FIG. 5A is a histogram of the intrinsic risk for the traversability training data sets collected in an asphalt road environment, and FIG. 5B is a histogram of the intrinsic risk for the traversability training data sets collected in a cobblestone road environment.

When the mobile robot 100 was manually driven in two different environments, one paved with asphalt and the other paved with cobblestone, situations with high intrinsic risk were rarely encountered in both cases. On the other hand, it can be seen that the cumulative risk of the traversability training data sets shows different aspects between different environments. This variability in distribution may make it difficult to assume a specific parametric distribution.

Figure 5C:
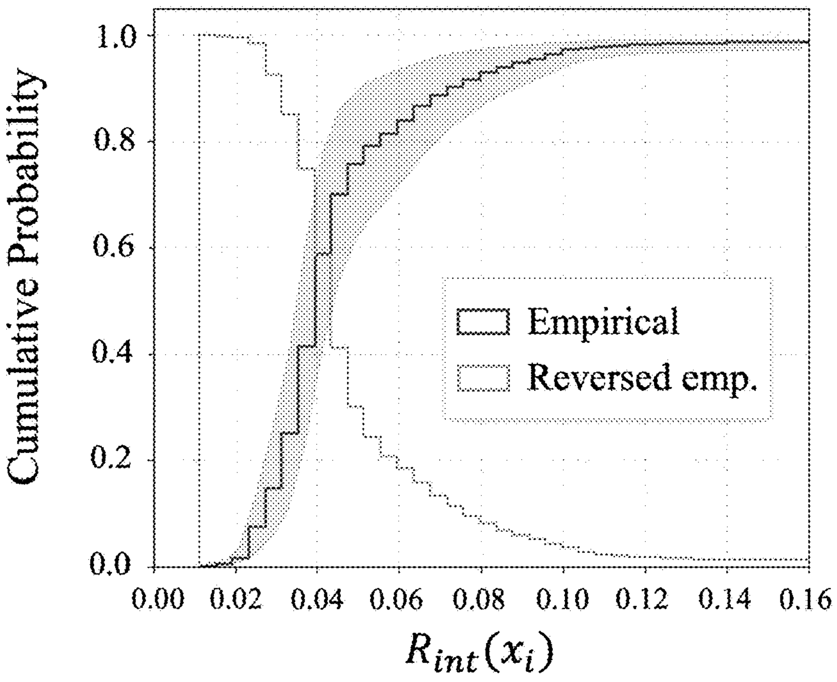
Figure 5D:
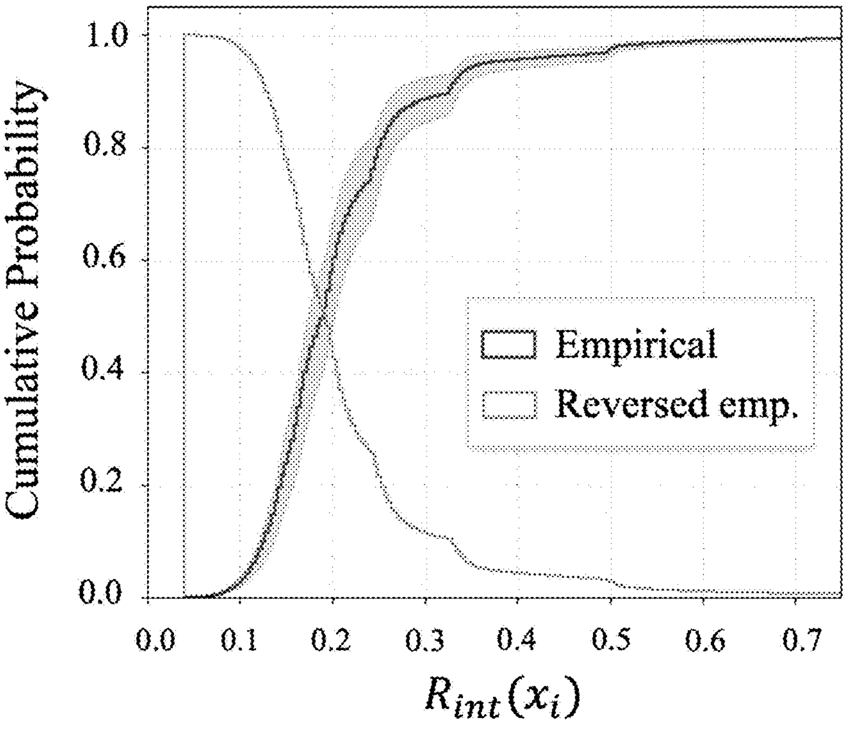

FIGS. 5C and 5D are graphs showing an intrinsic risk (an x-axis) and the cumulative risk (a y-axis) using it, and are recorded in blue (empirical). FIG. 5C shows a cumulative risk calculated by using the intrinsic risk recorded in FIG. 5A, i.e. a cumulative risk in an asphalt environment, and FIG. 5D is a cumulative risk calculated by using an intrinsic risk recorded in FIG. 5B, i.e. a cumulative risk in a cobblestone environment.

As can be seen in FIGS. 5A, 5B, 5C, and 5D, the cumulative risk may take different forms depending on the traversing environment of the mobile robot 100. That is, for the traversability training data sets with the same terrain attribute values, the intrinsic risk may be calculated to be the same in different driving environments, while the cumulative risk may be calculated to be different.

Referring to FIGS. 5C and 5D, it can be seen that when the intrinsic risk in an asphalt environment has a value of 0.1, the cumulative risk has a value of approximately 1.0. That is, in the asphalt environment, when the intrinsic risk is 0.1, the cumulative risk is also determined to indicate dangerous terrain. On the other hand, in a rougher cobblestone environment, when the intrinsic risk has the same value of 0.1, the cumulative risk is calculated to be very close to 0.

That is, the cumulative risk perceived by the mobile robot 100 is different when the mobile robot 100 traverses only on a flat and smooth terrain and when the mobile robot 100 traverses on a rough terrain, and by utilizing this, the risk of the terrain is reevaluated on the basis of the traversing experience of the mobile robot 100, enabling adaptive data processing depending on the environment.

Meanwhile, the risk calculation part 150 according to the embodiment of the present disclosure may calculate an importance weight by using the intrinsic risk and the cumulative risk in S17.

Here, the importance weight is a quantification of the risk of a terrain, wherein the quantification is performed by combining the intrinsic risk of terrain attributes and the cumulative risk that reflects the traversing experience of the mobile robot 100.

In an embodiment, the risk calculation part 150 may calculate the importance weight via [Mathematical expression 3].

$$w(x_i) = \mathcal{R}_{int}(x_i)\cdot\mathcal{R}_{cum}(x_i) \qquad \text{[Mathematical expression 3]}$$

That is, the importance weight may be calculated by the product of the intrinsic risk and the cumulative risk.

Meanwhile, the risk-aware self-training part 160 according to the embodiment of the present disclosure may train the traversability evaluation model 161 for traversability evaluation through self-training thereof which uses the plurality of traversability training data sets and the plurality of non-traversability training data sets in S18.

Here, the risk-aware self-training part 160 trains the traversability evaluation model 161 by reflecting the traversal risk in the self-training of the traversability evaluation model 161. In an embodiment, the risk-aware self-training part 160 includes reflecting the importance weight and the cumulative risk in the self-training of the traversability evaluation model 161, wherein the importance weight and the cumulative risk are reflected in a loss function.

In an embodiment, the risk-aware self-training part 160 may reflect the importance weight in a weighted loss function and may reflect the cumulative risk in a regularization loss function.

In an embodiment, the weighted loss function may be defined as [Mathematical expression 4].

$$\mathcal{L}_i(\theta) = -w_i(y_i\log(p_i) + (1-y_i)\log(1-p_i)) \quad \text{[Mathematical expression 4]}$$

Here, $w_i$ refers to the importance weight, $p_i$ refers to a multi-layer perceptron (MLP) with learnable parameters θ, and $y_i$ refers to the labeling value. In [Mathematical expression 4], the notation of $x_i$ is omitted to simplify the formula.

The mobile robot 100 of the present disclosure incorporates entropy regularization to prevent prediction distribution from being overly concentrated. The mobile robot 100 of the present disclosure integrates the navigation experience of the mobile robot 100 into an entropy regularization framework. In particular, $\mathcal{R}_{cum}$ derived from the previous navigation of the mobile robot 100 is used to adjust the effects of the entropy regularization. The prediction reliability of a model may be adjusted according to the familiarity of a terrain. After that, regularization loss function for each sample xi may be defined as [Mathematical expression 5].

$$\mathcal{L}_{entropy,i}(\theta) = -\mathcal{R}_{cum}(x_i)\cdot p_i\log(p_i) \quad \text{[Mathematical expression 5]}$$

Finally, the learning objective function may be defined as [Mathematical expression 6].

$$\min_{\theta}\frac{1}{N}\sum_{i=1}^{N}\{\mathcal{L}_i(\theta) + \lambda\mathcal{L}_{entropy,i}(\theta)\} \quad \text{[Mathematical expression 6]}$$

In [Mathematical expression 6], N refers to the total number of traversability training data sets and the non-traversability training data sets, and λ refers to the contribution of the regularization loss function. $\lambda \in \mathbb{R}$, adjusts the contribution of the entropy regularization. Here, navigation experience of the mobile robot 100 is integrated into the entropy regularization formula, as illustrated by [Mathematical expression 5] and [Mathematical expression 6].

The traversability evaluation model 161, which is self-trained as described above, later evaluates traversability by taking as input the attribute data sets generated by the attribute data generation part 130 during the actual driving of the mobile robot 100 and outputs a result.

Hereinafter, the experimental results of the mobile robot 100 according to the embodiment of the present disclosure will be described with reference to FIGS. 6A, 6B, 7A, 7B, and 8.

Figure 6A:
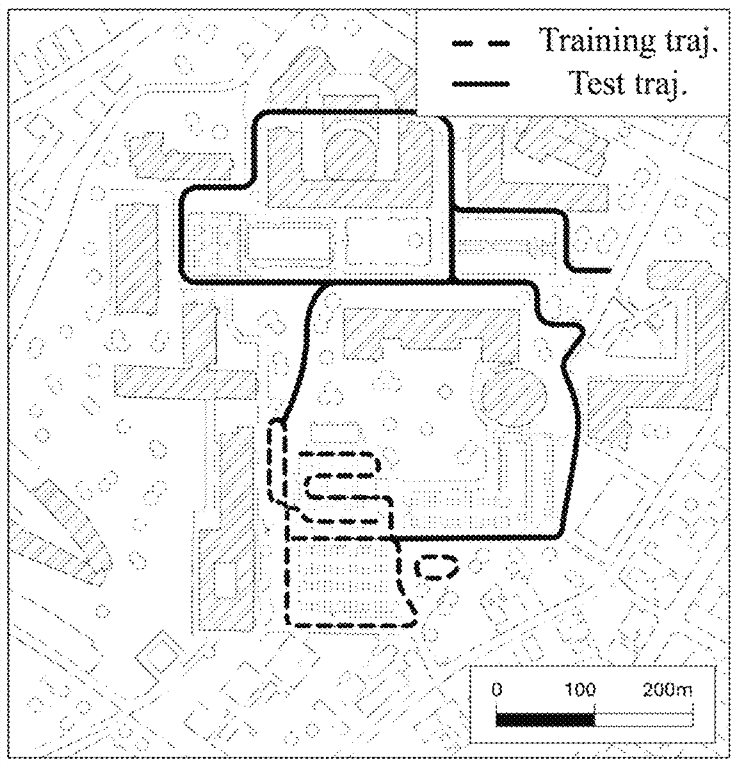
FIGS. 6A, 6B, 7A, 7B, and 8 are views illustrating experimental results of the mobile robot capable of learning risk-aware traversability via accumulated navigation experience according to the embodiment of the present disclosure.
Figure 6B:
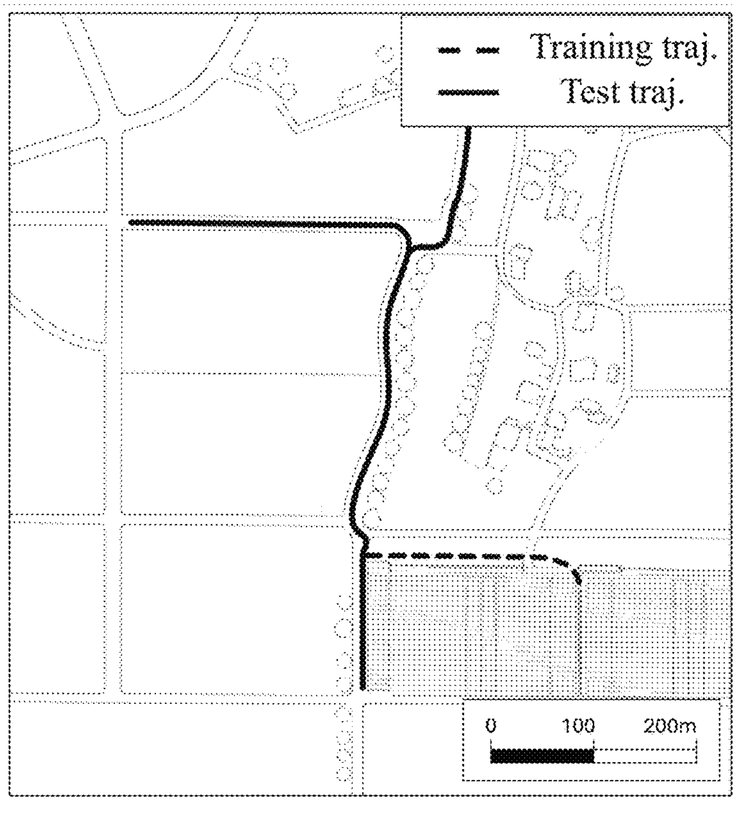

First, the mobile robot 100 is applied as a two-wheeled differential robot. The mobile robot 100 is designed for urban living environments and may operate in a variety of outdoor terrains. Experiments were conducted in two different environments. The first experiment was conducted in an urban college campus environment, and the second experiment was conducted in a farm road environment. FIGS. 6A and 6B illustrate the two experimental environments and the resulting trajectories of the mobile robot 100. In the two environments, the mobile robot 100 traversed for approximately 10 minutes for training at an average linear speed of 0.9 m/s.

[Table 1] shows training data sets collected in each environment. Since training data sets are collected from each grid cell on the elevation map, a significant amount of data may be acquired in a short period of time while performing manual traversing.

TABLE 1

| Dataset | No. of training sample($N_l/N_\mu$) | Label noise rate |
|---|---|---|
| Urban campus | 92,213/232,682 | 2.7% |
| Farm road | 30,835/260,091 | 5.1% |

The urban campus environment shown in FIG. 6A spans approximately 510 m×460 m, with a maximum elevation change value of 17 m. The maximum slope of the terrain is 14°. The urban campus environment is mostly asphalt terrain. There are some damaged roads, cobblestone roads, and roads with minor obstacles. By considering that different types of terrain are distributed across different locations, training areas were randomly selected instead of exploring all possible terrains. During the training process of the mobile robot 100, the mobile robot 100 mainly drove on smooth asphalt roads.

In the urban campus environment, a total of 324,895 data samples were collected, of which 28.4% were labeled and created as a training data set. For labeling as non-traversable, the attribute threshold for the step height value was set to 0.1 m.

FIG. 6B shows an aerial photograph of the farm road environment. The farm road is generally an unpaved dirt or gravel road that includes various terrain obstacles. A total of 290,926 samples were collected from the environment, of which only 10.6% were labeled and created as a training data set.

Figure 7A:
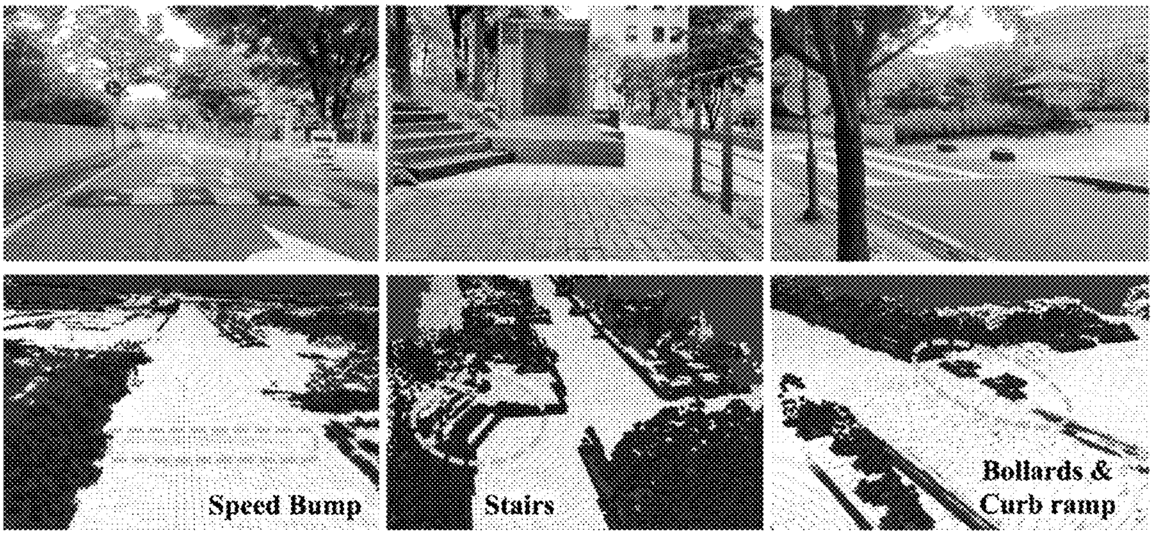
Figure 7B:
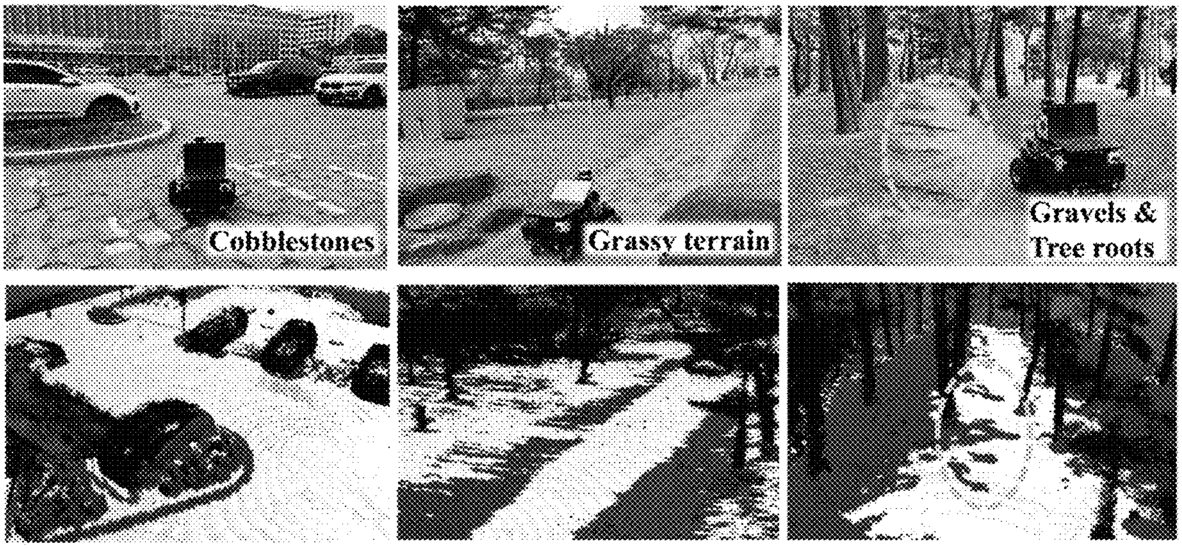

Ramps, bollards, and speed bumps were identified as major urban environmental elements that restrict the traversing direction of the mobile robot 100, as illustrated in FIG. 7A. FIG. 7B shows a semi-structured terrain covered with cobblestones, grass, and gravel, with tree roots protruding therefrom. Unlike flat paths, this environment requires accurate traversability estimation.

As illustrated in FIGS. 7A and 7B, steps, curbs and bollards were predicted as making traversing impossible due to their unique geometric characteristics. Despite the similar heights of the curb and the speed bump, the traversability evaluation model 161 differentiated between the speed bump and the non-traversable curb through risk-aware self-training according to the embodiment of the present disclosure. The mobile robot 100 was predicted to be traversable on the speed bump and was able to traverse across the speed bump.

Tree roots, cobblestone-paved roads, and grassy terrain in urban environments pose serious challenges to a trained model because they do not appear frequently during training. In FIG. 7B, the traversability evaluation model 161 according to the embodiment of the present disclosure effectively separates traversable areas from non-traversable areas despite the limitations of the training data sets.

In particular, low-height terrain obstacles that were not present in a labeled data set were accurately predicted as non-traversable. This is because the use of pseudo-labels during self-training enables the traversability evaluation model 161 to predict situations beyond those explicitly represented in the labeled training data set.

Figure 8:
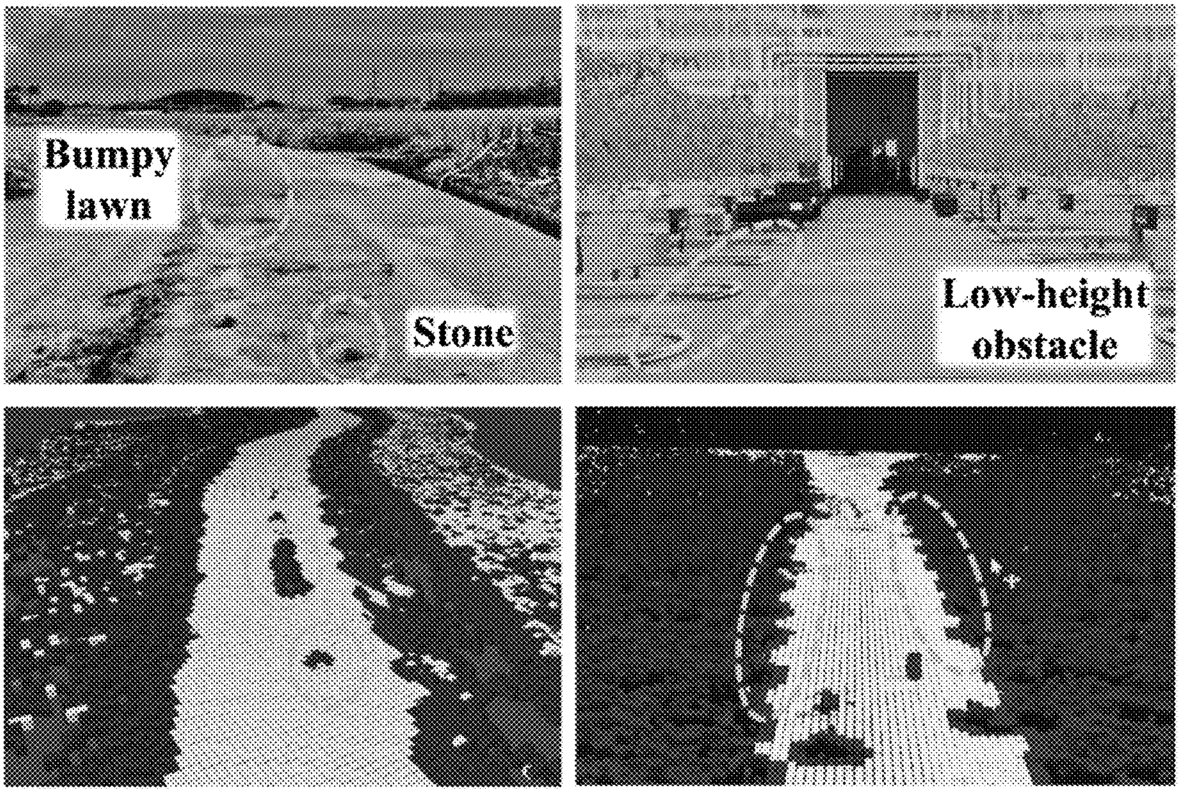

The result of predicting traversability in the farm road environment is shown in FIG. 8. Despite visual similarity between a boulder and a surrounding unpaved road, the traversability evaluation model 161 according to the embodiment of the present disclosure correctly evaluated the boulder as an obstacle.

Although some embodiments of the present disclosure have been illustrated and described, it will be apparent to those skilled in the art that modifications may be made to the embodiments without departing from the principles or spirit of the present disclosure. The scope of the present disclosure will be determined by the appended claims and equivalents thereof.

What is claimed is:

1. A mobile robot configured to learn risk-aware traversability via accumulated navigation experience, the mobile robot comprising:

a point cloud sensor configured to acquire point cloud data;

an elevation map generation part configured to generate a grid-based elevation map by using the point cloud data;

an attribute data generation part configured to calculate a plurality of types of terrain attribute values for each grid cell of a plurality of grid cell from the elevation map and generate an attribute data set comprising the plurality of types of terrain attribute values, for each grid cell;

a training data generation part configured to generate a plurality of traversability training data sets and a plurality of non-traversability training data sets by labeling whether or not each of the attribute data sets is in a traversable condition;

a risk calculation part configured to calculate a traversal risk for each of the traversability training data sets; and a risk-aware self-training part configured to train a traversability evaluation model configured to perform a traversability evaluation through self-training of the traversability evaluation model by using the plurality of traversability training data sets, the plurality of non-traversability training data sets, and the traversal risk for each of traversability training data sets, wherein the risk calculation part is further configured to:

calculate an intrinsic risk for each of the traversability training data sets by calculating a weighted average of the plurality of types of terrain attribute values of the attribute data set comprising a respective traversability training data set; and calculate a cumulative risk for each of the traversability training data sets by calculating a relative risk of a respective traversability training data set of the traversability training data sets calculated in comparison to the traversability training data sets as a whole based on the intrinsic risk calculated for each of the traversability training data sets.

2. The mobile robot of claim 1, wherein the training data generation part is further configured to:

generate the traversability training data sets by labeling, as traversable, each attribute data set for each grid cell which exists on at least one trajectory traversed by the mobile robot; and generate the non-traversability training data sets by labeling, as non-traversable, attribute data sets outside an attribute threshold set for at least one type of the plurality of types of terrain attribute values for each grid cell which does not exist on at least one trajectory traversed by the mobile robot.

3. The mobile robot of claim 1, wherein the risk calculation part is further configured to calculate the intrinsic risk using the mathematical expression:

$$R_{int}(x_i)=w^T x_i$$

wherein $x_i$ is an attribute data set of the traversability training data sets, each grid cell has an index, wherein i is an index of a grid cell, $R_{int}(x_i)$ refers to the intrinsic risk of an attribute data set $x_i$ w refers to a vector consisting of weights, and T is the mathematical expression for a transpose operation of a matrix.

4. The mobile robot of claim 3, wherein the risk calculation part is further configured to calculate the cumulative risk is calculate using the mathematical expression:

$$\mathcal{R}_{cum}(x_i)=\frac{1}{n}\sum_{k=1}^{n}\mathbb{I}(r_k \le r_i)$$

wherein $R_{cum}(x_i)$ is the cumulative risk of an attribute data set $x_i$ of the traversability training data sets, n is the number of the traversability training data sets, II is an evaluation function configured to evaluate to 1 when the condition in the parenthesis of this mathematical expression is met and 0 when the condition in the parenthesis of this mathematical expression is not met, $r_i$ is the intrinsic risk of an attribute data set $x_i$ of the traversability training data sets, k is and index value of a grid-cell, and $r_k$ is an intrinsic risk of an attribute data set with a grid-cell index k.

5. The mobile robot of claim 4, wherein the risk calculation part is further configured to calculate an importance weight for each of the traversability training data sets based on the respective intrinsic risk and the respective cumulative risk; and the risk-aware self-training part is further configured to utilize the importance weight and the cumulative risk for each of the traversability training data sets in the self-training of the traversability evaluation model.

6. The mobile robot of claim 5, wherein the risk calculation part is further configured to calculate the importance weight as a product of the respective intrinsic risk and the respective cumulative risk for each of the traversability training data sets.

7. The mobile robot of claim 5, wherein the risk calculation part is further configured to use the respective importance weight and the respective cumulative risk for each of the traversability training data sets in a loss function of the traversability evaluation model.

8. The mobile robot of claim 7, wherein the loss function comprises:

a weighted loss function using the respective importance weight for each of the traversability training data sets; and a regularization loss function using the respective cumulative risk for each of the traversability training data sets.

9. The mobile robot of claim 8, wherein the weighted loss function is defined as the following mathematical expression:

$$\mathcal{L}_i(\theta) = -w_i(y_i\log(p_i) + (1 - y_i)\log(1 - p_i))$$

wherein θ are learnable parameters, $w_i$ is the importance weight, $p_i$ is a multi-layer perceptron (MLP) with learnable parameters θ, and $y_i$ is a labeling value;

wherein the regularization loss function is defined as the following mathematical expression:

$$\mathcal{L}_{entropy,i}(\theta) = -\mathcal{R}_{cum}(x_i)\cdot p_i\log(p_i);$$

and wherein a learning objective function of the traversability evaluation model is defined as the following mathematical expression:

$$\min_{\theta}\frac{1}{N}\sum_{i=1}^{N}\{\mathcal{L}_i(\theta) + \lambda\mathcal{L}_{entropy,i}(\theta)\}$$

wherein N is the total number of the traversability training data sets and the non-traversability training data sets, and λ is a contribution of the regularization loss function.

10. The mobile robot of claim 1, wherein the terrain attribute values comprise at least two values of a step height value, a slope value, a roughness value, a curvature value, and an elevation variance value.

11. The mobile robot of claim 1, further comprising:

a noisy training data removal part, wherein the noisy training data removal part is configured to remove each traversability training data set or each non-traversability training data set of the plurality of traversability training data sets and the plurality of non-traversability training data sets whose label changes over time.

* * * * *